(12) United States Patent
Musselman et al.

(10) Patent No.: US 6,561,750 B1
(45) Date of Patent: May 13, 2003

(54) TILTING PLATFORM FOR ROLL TESTING AUTOMOTIVE VEHICLES

(75) Inventors: Mark H. Musselman, Fort Wayne, IN (US); Floyd E. Fegley, Fort Wayne, IN (US); Curtis W. Meyer, New Haven, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 114 days.

(21) Appl. No.: 09/680,983

(22) Filed: Oct. 5, 2000

(51) Int. Cl.[7] .................................................. B63C 3/00
(52) U.S. Cl. ...................... 414/678; 414/778; 414/779; 414/780; 414/781; 254/3 R
(58) Field of Search ................................ 414/678, 778, 414/779, 780, 781; 298/12, 13; 254/3 R, 3 B, 3 C; 403/52, 119, 120

(56) References Cited

U.S. PATENT DOCUMENTS

| | | | | |
|---|---|---|---|---|
| 1,500,284 A | * | 7/1924 | Stubbs | 269/58 |
| 4,225,105 A | * | 9/1980 | Nakamura | 248/185 |
| 4,238,959 A | * | 12/1980 | McCann | 73/432 SD |
| 5,169,275 A | * | 12/1992 | Kratz | 414/392 |
| 5,678,978 A | * | 10/1997 | Markham | 414/477 |

OTHER PUBLICATIONS

WO 94/16982 Econd'or Sweden, Aug. 4, 1994.*

* cited by examiner

Primary Examiner—Eileen D. Lillis
Assistant Examiner—Michael Lowe
(74) Attorney, Agent, or Firm—Jeffrey P. Calfa; Neil T. Powell; Dennis Kelly Sullivan (57) ABSTRACT

A tilting platform for roll testing automotive vehicles rotates the automotive vehicle so that data can be collected to determine various roll characteristics of the vehicle. The tilting platform includes a support platform that is pivotally attached to a floor hoist. A pivot pin is positioned away from the midpoint of the support platform so that a distal end of the support platform rotates downward and a proximal end rotates upward when the floor hoist is raised.

19 Claims, 6 Drawing Sheets

FIG. 6 ously rotate the entire vehicle.

TILTING PLATFORM FOR ROLL TESTING AUTOMOTIVE VEHICLES

FIELD OF THE INVENTION

The present invention relates generally to roll testing automotive vehicles, and more particularly, to a tilting platform.

BACKGROUND

Designers of automotive vehicles find it necessary to conduct numerous tests on proposed vehicle designs before a new vehicle can be sold to consumers. Many of these tests are mandated by government regulations, but many additional tests are also conducted voluntarily by vehicle designers. The types of tests that designers conduct on proposed vehicle designs are directed to a number of potential concerns. Thus, some tests are directed to the performance and customer acceptance of the new vehicle, while other tests focus on safe operation of the vehicle.

One test that is commonly conducted on automotive vehicles is referred to generally as roll testing. Roll stability is a critical factor when designing new vehicles because roll stability affects safety, handling performance, and driver comfort and satisfaction. Roll stability of a completely assembled vehicle, however, is difficult to calculate theoretically because each individual part in a vehicle works together to affect overall roll stability. Therefore, laboratory tests are usually performed on a sample vehicle to determine the roll characteristics of the new vehicle design. Typically, this laboratory test is performed by supporting the weight of the vehicle at the vehicle tires and slowly rotating the entire vehicle around a longitudinal axis that extends from the rear to the front of the vehicle. Thus, as the vehicle is rotated, one side of the vehicle is raised above the other side of the vehicle. The vehicle rotation also causes the weight of the vehicle to shift away from the raised tires towards the lower tires as the angle of rotation increases. Because the roll characteristics of a vehicle change when the vehicle is loaded with different cargos, designers typically perform a number of roll tests on each new vehicle to represent several different cargo possibilities.

A number of important roll characteristics can be calculated from the data that is gathered from roll testing a vehicle. One characteristic is the rollover point of the vehicle. The rollover point occurs when the weight of the tires fully shifts away from the raised tires onto the lower tires, thus representing the point at which the vehicle may fall over onto its side. Therefore, the rollover point is an important safety characteristic in vehicle design. A number of other characteristics can also be determined from the roll test, including vehicle center of gravity, roll stiffness, lateral stiffness, torsional stiffness, and load shift between axles. A brief description of each of these characteristics will be helpful. The center of gravity of the vehicle represents a longitudinal axis through the vehicle around which the vehicle theoretically would freely rotate. This characteristic influences the angle of rotation of the rollover point and is useful in a number of other engineering calculations. Roll stiffness, or body roll, is a measurement of the angle of rotation of the vehicle body relative to the angle of rotation of the tires. Typically, the springs in the vehicle suspension contribute most to body roll. Lateral stiffness is a measurement of horizontal body movements parallel to the axles. This movement is usually caused by the suspension and is generally unwanted. Torsional stiffness is a specific measurement of the rotation of the vehicle frame during vehicle rotation. Typically, this characteristic is measured by attaching inclinometers along the length of the frame and comparing the differences in angular rotation between each of the inclinometers. Load shift between axles usually occurs between axles that share a linked suspension. Because the suspension components of a linked suspension are connected to more than one axle, a certain amount of weight may be transferred from one axle to another axle during vehicle rotation.

One problem often encountered in conducting roll tests involves gaining access to the facilities necessary to perform the tests. Traditionally, only independent laboratories have had facilities capable of performing the desired roll tests. In the case of heavy-duty vehicles, such as trucks and tractor-trailer rigs, only a small number of independent laboratories have had adequate facilities for conducting these tests. This situation has made scheduling the tests difficult because independent laboratories require a significant amount of planning notice to schedule each of their customers. Problems can also arise once the tests have started when unexpected complications occur that require more time than the laboratory has allotted. An additional problem involved with using independent laboratories to conduct roll tests is the high cost associated with the tests. Typically, the independent laboratories are operated as for-profit businesses. Thus, the vehicle designer must pay expensive fees for each of the tests that are conducted. In addition to the laboratory fees, however, the vehicle designer must also absorb extra costs associated with transportation to the laboratory, including the test vehicle, additional test equipment that may not be available at the laboratory, and the vehicle designer's own technicians and engineers.

Another problem with using independent laboratories is the potential risk of disclosing confidential information related to the newly designed vehicles. Typically, the need for confidentiality during roll testing is particularly important because these test are usually conducted on new vehicle designs that the designer wishes to conceal from competitors and the marketplace. Thus, unintended disclosures before the product launch of the new vehicle may adversely affect the market for the designer's new vehicle. Accordingly, independent laboratories are often viewed by vehicle designers as an area of potential risk for unwanted disclosures related to new vehicle. One potential area of risk for disclosures occurs when the vehicle is transported to the independent laboratory. Still another risk area occurs at the laboratory itself. As explained previously, independent laboratories usually serve many different customers at the same facilities. Thus, it is difficult for the laboratories to assure the same level of security that vehicle designers are accustomed to at their own facilities. Moreover, the testing facilities for large, heavy-duty vehicles are usually located outdoors with only minimal security provided.

The current equipment that independent laboratories use for roll testing generally is not adaptable for use by vehicle designers at their own design facilities. One problem with the current equipment is that it is usually permanently installed, and therefore, the space allotted for the equipment can only be used for performing roll tests. The total space required for roll testing equipment is often about twice the size of the vehicle being tested. Thus, in the case of large, heavy-duty trucks, the space required for roll testing equipment can be costly, especially if an indoor testing facility is desired.

Another problem with current test equipment is the high cost to build the equipment. One significant cost of these systems is the high performance hydraulic cylinders that are needed to lift and roll the test vehicle. In addition, a separate hydraulic power source to actuate the cylinders is usually needed. Typically, the hydraulic cylinder and the power source are specially purchased for the test equipment. The cylinders and power source are also usually permanently mounted in the equipment, making it infeasible to use this equipment for additional tasks.

BRIEF SUMMARY OF THE INVENTION

Accordingly, a tilt platform is provided for roll testing an automotive vehicle. The tilt platform can be used with a standard floor hoist that is usually used for maintenance of automotive vehicles, thus providing a less expensive alternative to current test equipment. Support platforms can also be detached from the floor hoists, thus allowing the workspace and the floor hoists to be used for additional tasks.

The tilt platform includes a support platform that is pivotally attached to a floor hoist with a pivot pin. The pivot pin is positioned away from the midpoint of the support platform, thus forming a distal end and a proximal end of the support platform. Rollers are provided on the distal end of the support platform to enable the distal end to roll along a floor as the floor hoist is raised or lowered. The support platform also includes top support pads for supporting the weight of the vehicle tires.

BRIEF DESCRIPTION OF SEVERAL VIEWS OF THE DRAWINGS

The invention, including its construction and method of operation, is illustrated more or less diagrammatically in the drawings, in which.

DETAILED DESCRIPTION OF THE INVENTION

Referring now to the drawings, a tilting platform 20 is provided for roll testing automotive vehicles 10. Although the tilting platform 20 can be used for roll testing a variety of automotive vehicles, the preferred embodiment, as described, is used for roll-testing heavy-duty trucks 10. These trucks 10 can include both single frame models, in which the cab and the cargo box are both attached to a single frame, and tractor-trailer rigs, in which the cab and the engine are attached to a trailer-type cargo box or platform through a hitch. Thus, the number of vehicle axles 12 used in these vehicles 10 can vary between as few as two axles 12 for small, single frame trucks 10 to as many as six axles 12 for large, tractor-trailer rigs 10. The maximum weight on an axle 12 for these types of trucks 10 is usually about 26,000 lb.

One advantage of the tilting platform 20 is that it can be used with standard hydraulic floor hoists 22 that are common in heavy-duty truck servicing and maintenance facilities. These floor hoists 22 are well-known to those familiar with performing maintenance on trucks 10 and are usually used to lift a truck 10 off the ground to provide easy access to the underside of the truck 10. Typically, at least six floor hoists 22 are provided in an inline, spaced apart arrangement so that the truck 10 can be positioned over the floor hoists 22 with each truck axle 12 being supported by one of the floor hoists 22. Accordingly, the floor hoists 22 move up and down in a vertical direction to lift and lower the truck 10 as needed. The floor hoists 22 are usually rigidly mounted into a floor 18 and are not allowed to pivot or rotate. A lift capacity of about 30,000 lb. is common for each of the floor hoists 22.

A quick attach device 24 is preferably provided at the top of each floor hoist 22 for attaching and detaching different lift supports. The quick attach device 24 shown includes internal rails 26 that extend horizontally through the quick attach device 24. A stop 28 is also provided within the rails 26 at a midpoint between the ends of the rails 26. Thus, various lift supports can be attached to the hoist 22 by sliding a lift support through the rails 26 and abutting the lift support against the stop 28.

Figure 5:
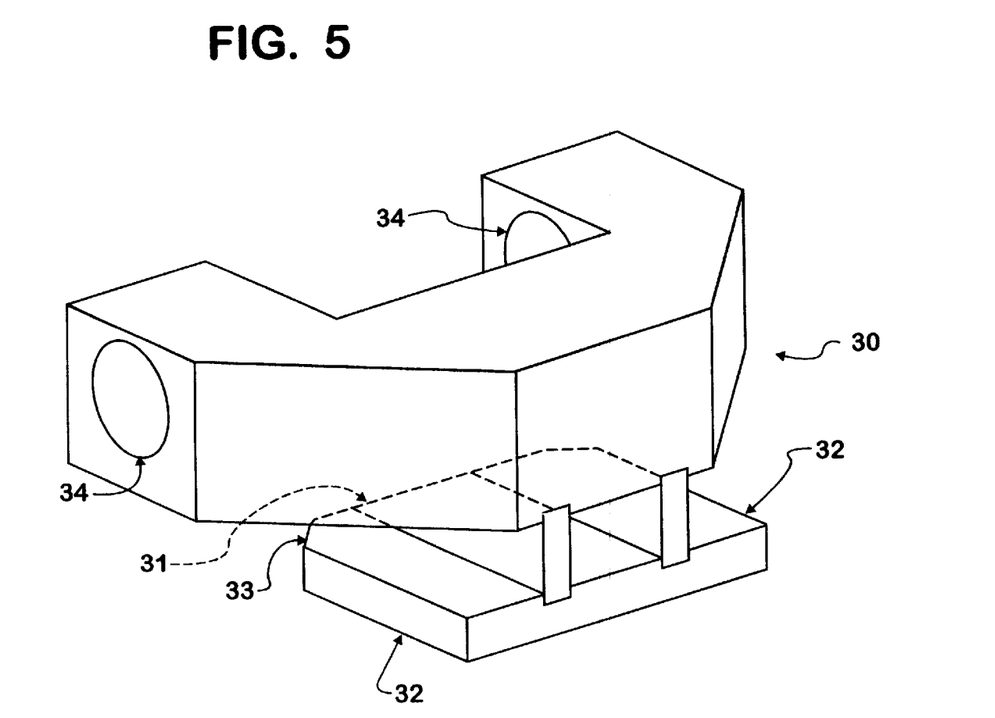
FIG. 5 is a perspective view of a yoke.
Figure 6:
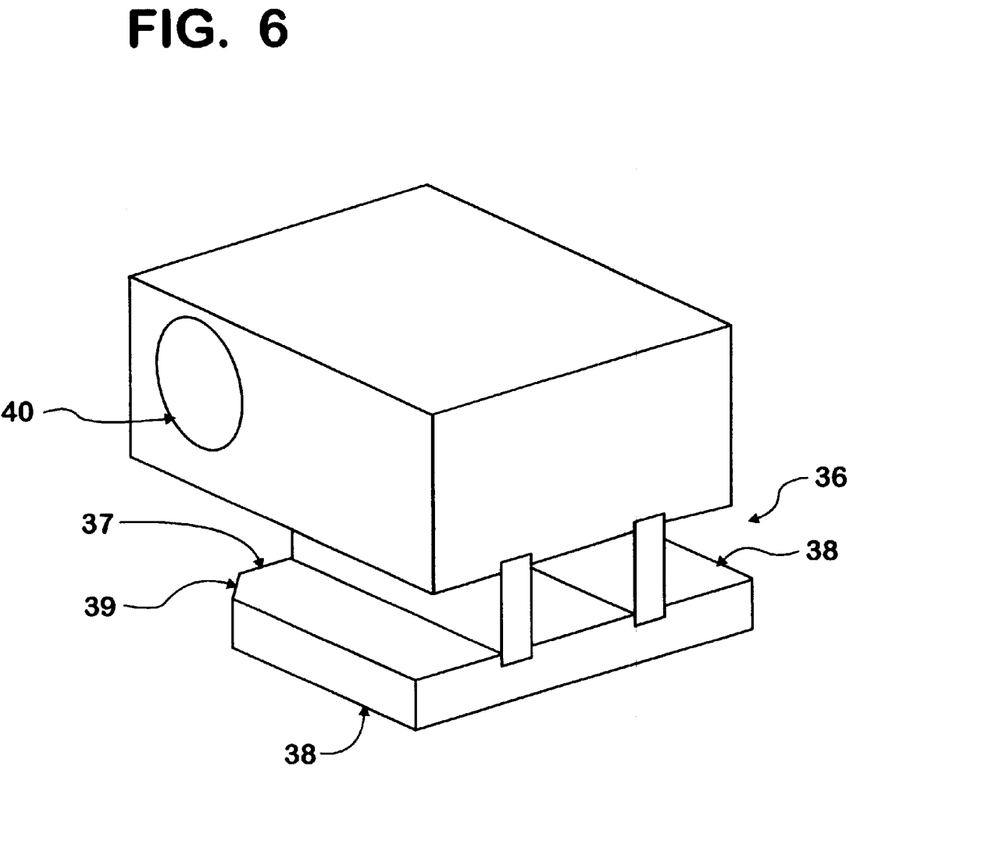
FIG. 6 is a perspective view of a center pivot.

A yoke 30 and a center pivot 36 are used to pivotally attach the support platform 44 to the quick attach device 24. Accordingly, the yoke 30 includes a flange 32 and the center pivot 36 includes a similar flange 38 that are both adapted to slide through the rails 26 in the quick attach device 24. To aid installation of the yoke 30 and center pivot 36 through the rails 26, angled lead-in corners 33, 39 are provided on the front end 31, 37 of both flanges 32, 38. The yoke 30 and the center pivot 36 are installed into the quick attach device 24 by sliding the flanges 32, 38 through opposite ends of the rails 26. Thus, the yoke 30 is installed into one end of the rails 26 until the front end 31 of the flange 32 abuts one side of the stop 28. Likewise, the center pivot 36 is installed into the other end of the rails 26 until the front end 37 of the center pivot flange 38 abuts the other side of the stop 28. The front ends 31, 37 of both flanges 32, 38 are offset towards the respective rear ends of the yoke 30 and the center pivot 36 to compensate for the position and thickness of the stop 28. Therefore, when both front ends 31, 37 abut opposite sides of the stop 28, the hole 40 in the center pivot 36 is aligned with the holes 34 in the yoke 30. When the pivot pin 42 is installed through the holes 34, 40 in the yoke 30 and the center pivot 36, the yoke 30 and the center pivot 36 become securely locked to the quick attach device 24 since the pivot pin 42 locks the yoke 30 and the center pivot 36 together and the stop 28 prevents the yoke 30 and the center pivot 36 from sliding together in either direction through the rails 26.

Figure 4:
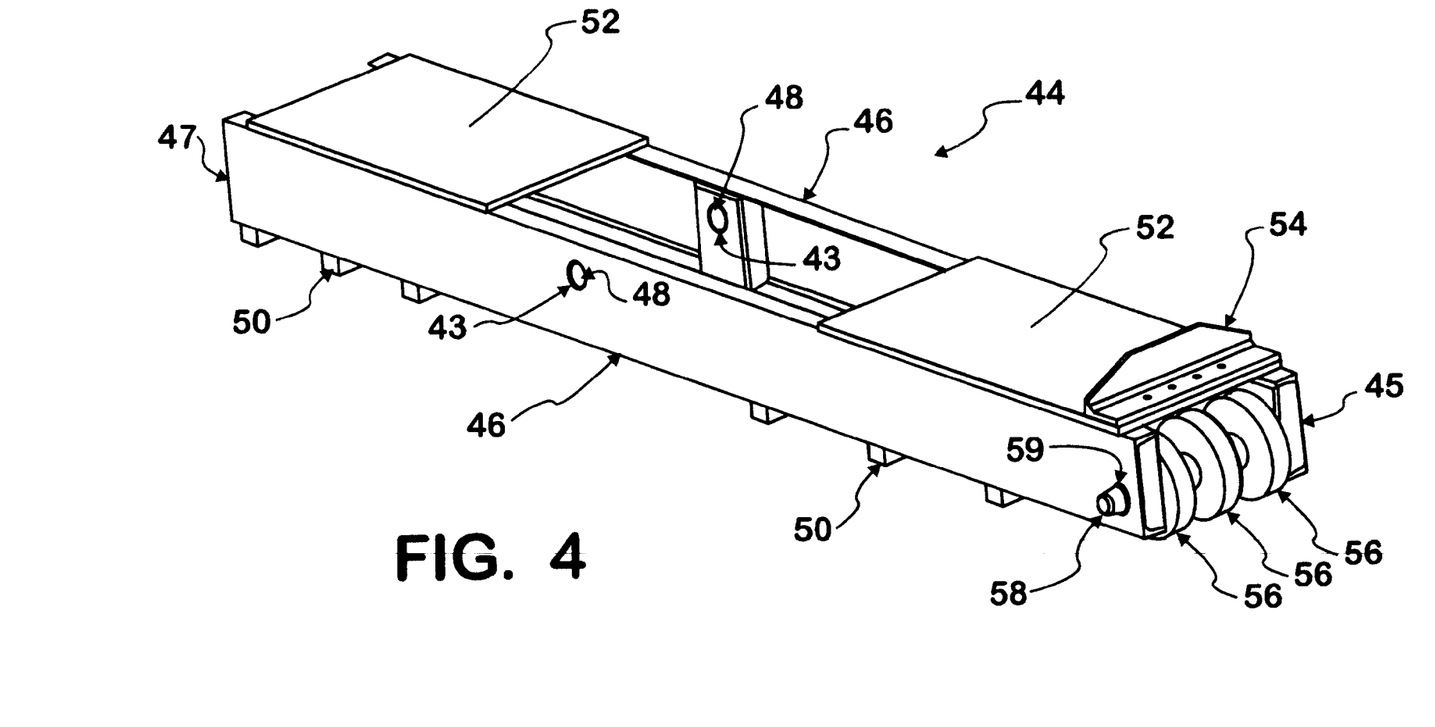
FIG. 4 is a perspective view of a support platform.

The support platform 44 is then pivotally attached to the yoke 30 and the center pivot 36 by installing the pivot pin 42 through the holes 34, 40 in the yoke 30 and the center pivot 36 and holes 48 the side support beams 46. The holes 48 in the side support beams 46 are positioned away from the midpoint of the support platform 44. Preferably, the support platform holes 48 are positioned so that the distal end 45 of the support platform 44 extends about 1.5 times farther from the pivot pin 42 than the proximal end 47 extends from the pivot pin 42. To improve pivoting of the support platform 44 about the pivot pin 42, brass bushings 43 are provided in the support platform holes 48. Preferably, the pivot pin 42 is about 2.1 inches in diameter.

The support platform 44 includes side support beams 46 that extend along the length of the support platform 44. Bottom cross members 50 also are provided to rigidly connect the side support beams 46 together. Additionally, top support pads 52 are rigidly connected to the top of the side support beams 46. A side support pad 54 is attached to the outside edge of the distal top support pad 52. Rollers 56 that allow the distal end 45 of the support platform 44 to roll along the floor 18 are also provided. Although a variety of rollers are possible, the preferred embodiment includes three steel rollers 56 about 9 inches in diameter. A pivot pin 58 is installed through the rollers 56 and the side support beams 46. Preferably, brass bushings 59 are installed in the side support beams 46 to improve rotation of the rollers 56.

Figure 1:
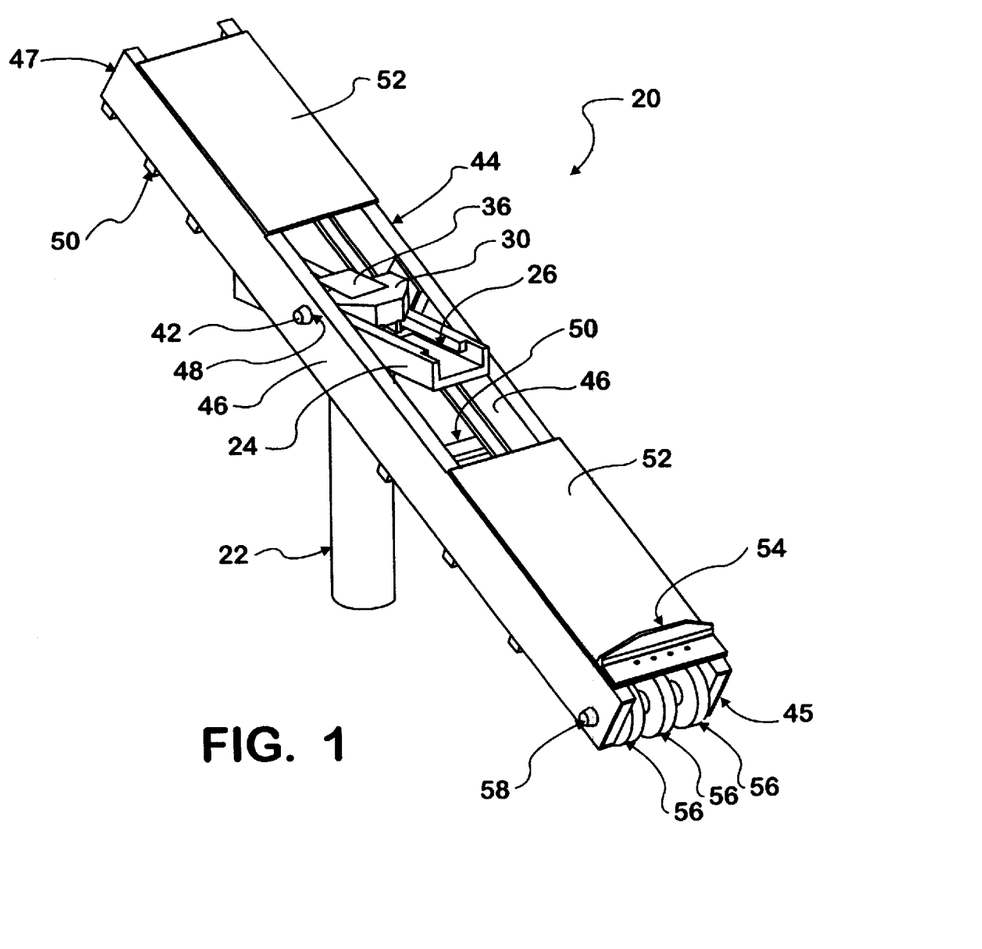
FIG. 1 is a perspective view of a tilting platform.
Figure 2:
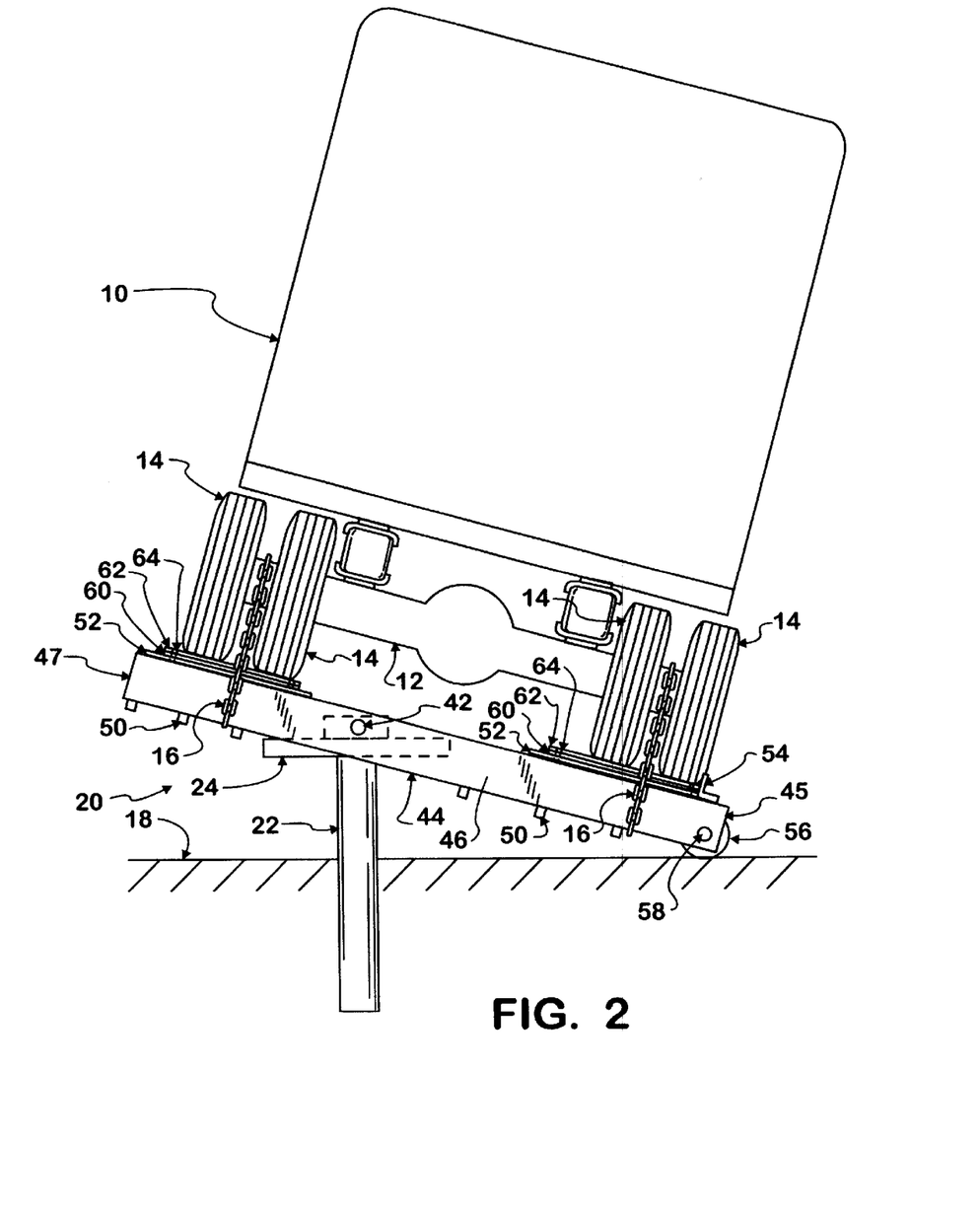
FIG. 2 is a rear elevational view of a roll test, showing a truck axle positioned on the tilting platform.
Figure 3:
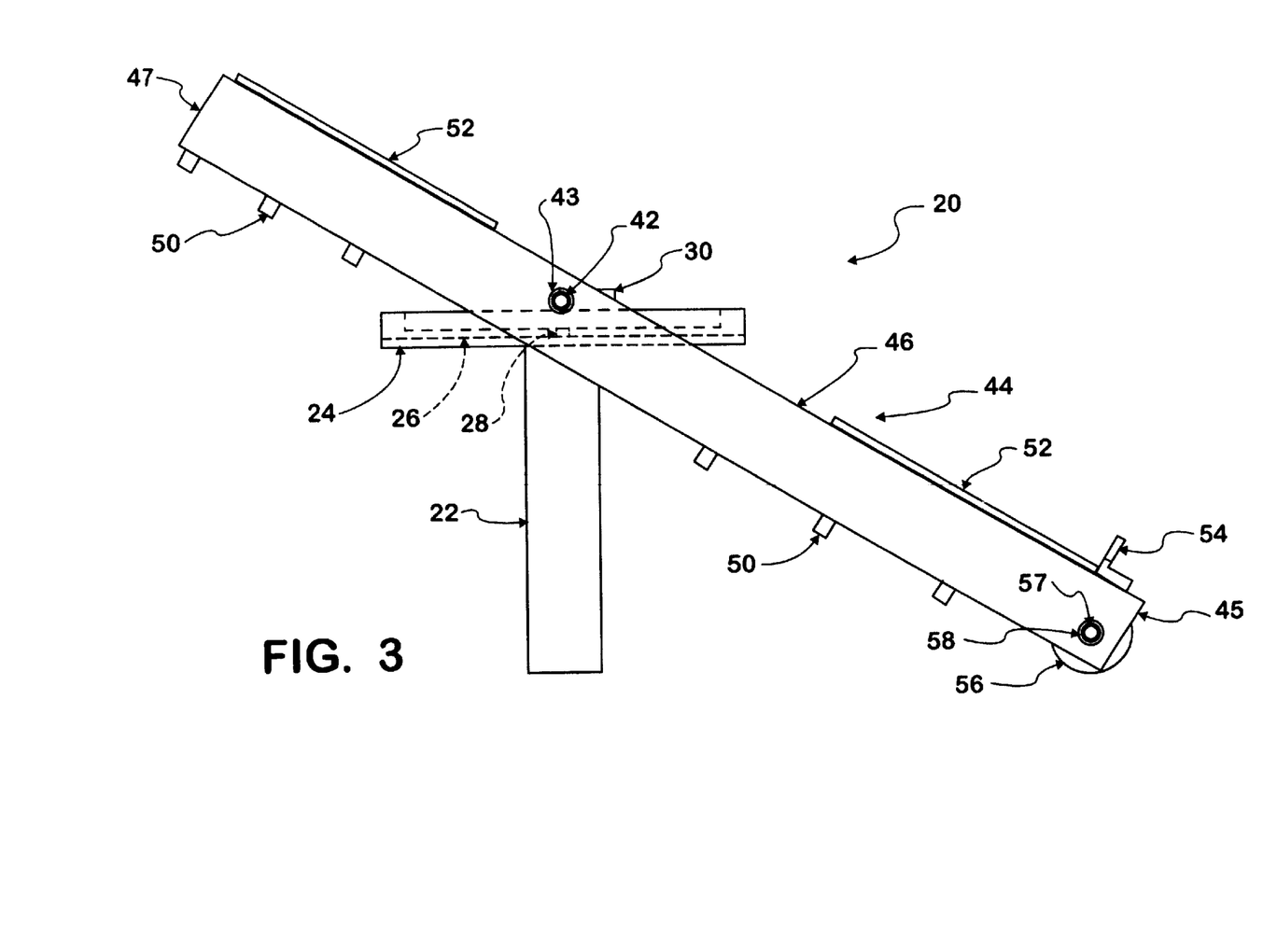
FIG. 3 is a rear elevational view of the tilting platform.

Accordingly, the tilting platform 20 provides a cost effective and flexible system for conducting roll tests. As shown in FIG. 2, a truck 10 can be positioned over several tilting platforms 20 so that the tires 14 of each axle 12 rest on separate support platforms 44. Load cells 60 are also positioned under each set of tires 14 to measure the weight of the truck 10 at each set of tires 14. Therefore, a load cell 60 is positioned on top of each top support pad 52, and a tire pad 62 is installed on top of each load cell 60. Retention pins 64 can also be provided that extend up from the top support pads 52 and through the tire pads 62 to prevent the tire pads 62 from sliding relative to the top support pads 52.

It is now apparent that when the floor hoists 22 are raised, the distal ends 45 of the support platforms 44 rotate downward and the proximal ends 47 of the support platforms 44 rotate upward. As the support platforms 44 rotate, the distal ends 45 of the support platforms 44 roll along the floor 18 toward the floor hoists 22 on the rollers 56 to compensate for the rotational movement. In most roll tests, each of the floor hoists 22 are raised equally together.

Thus, as the floor hoists 22 are raised, the truck 10 rotates along with the support platforms 44. The data from the load cells 60 and data from sensors (not shown) that measure either the height of the floor hoists 22 or the angle of the support platforms 44 is then sent to a monitoring computer (not shown). Other test sensors can also be connected to the computer to gather additional data from the test. For example, inclinometers can be attached to the frame of the truck 10 to measure angular deflection of the frame at different roll angles. Preferably, the computer constantly monitors the data from the sensors so that the floor hoists 22 can be continuously raised without having to stop at different measurement points. One example of a roll characteristic that can be quickly calculated from this test data is the roll over point of the truck 10. The roll over point occurs when the proximal load cells 60 measure zero weight from the raised tires 14. This indicates that the entire weight of the truck 10 has shifted to the lower tires 14 and the truck 10 is about to fall over onto its side. The floor hoists 22 are preferably stopped at this point to prevent the truck 10 from actually rolling over. However, safety chains 16 are also provided that attach the truck axles 12 to the support platforms 44 to prevent the truck 10 from rolling over. In addition, the side support pads 54 also prevent the truck 10 from sliding off the support platforms 44.

Typically, a roll test using the support platforms 44 can be completed in a single day. This estimate of time includes attaching the support platforms 44 to the floor hoists 22, running the test, and detaching the support platforms 44. Thus, roll tests can be conducted quickly and on short notice. The support platforms 44 also provide an efficient use of space because the support platforms 44 can be removed after completion of the test and the area can then be used for other tasks. The tilting platform 20 is also considerably less expensive than other testing equipment because the floor hoists 22 that a vehicle designer may already have can be used instead of purchasing special hydraulic cylinders and a power source. Because these advantages make it more feasible for truck designers to conduct roll tests at their own facilities and indoors instead of outdoors, truck designers can also greatly reduce the risk of disclosing confidential product information during roll tests.

While a preferred embodiment of the invention has been described, it should be understood that the invention is not so limited, and modifications may be made without departing from the invention. The scope of the invention is defined by the appended claims, and all devices that come within the meaning of the claims, either literally or by equivalence, are intended to be embraced therein.

We claim:

1. A tilting platform comprising a hoist, said hoist being rigidly mounted to a floor for purely vertical movement relative thereto; a support platform pivotally attached to said hoist, said pivotal attachment being away from a midpoint of said platform thereby one end of said platform being a distal end and the other end being a proximal end, wherein said distal end is adapted to move relative to said floor; and a load cell adapted to measure the weight of a tire disposed on said support platform.

2. The tilting platform according to claim 1, wherein said distal end is about 1.5 times farther from said pivotal attachment than said proximal end.

3. The tilting platform according to claim 1, wherein said adapted distal end comprises a roller rotatably attached to said support platform.

4. The tilting platform according to claim 1, wherein said support platform comprises at least two side beams extending the length of said support platform and a top support pad attached to said side beams.

5. The tilting platform according to claim 4, wherein said support platform further comprises bottom cross members that rigidly connect said side beams.

6. The tilting platform according to claim 1, wherein said pivotal attachment comprises a pivot pin extending through a hole in said support platform.

7. The tilting platform according to claim 6, wherein said hole includes a brass bushing.

8. The tilting platform according to claim 1, further comprising a tire pad disposed on said load cell and attached to said support platform thereby preventing said tire pad from sliding relative to said support platform.

9. The tilting platform according to claim 1, further comprising a quick attach device adapted to readily attach and detach said support platform from said hoist.

10. The tilting platform according to claim 9, wherein said quick attach device comprises rails, said pivotal attachment comprises a pivot pin extending through a hole in said support platform, said pivotal attachment further comprises a lift support with a flange adapted to slide through said rails, said lift support having a hole therethrough for installation of said pivot pin.

11. The tilting platform according to claim 10, wherein said quick attach device comprises a stop in said rails and said lift support comprises a yoke and a center pivot, said yoke and said center pivot each having at least one of said lift support hole and one of said flange, said flanges being disposed such that said yoke hole and said center pivot hole align when both of said flanges abut opposite sides of said stop.

12. The tilting platform according to claim 11, wherein said support platform comprises at least two side beams extending the length of said support platform and a top support pad attached to said side beams, said support platform.hole being a hole through said side beams.

13. The tilting platform according to claim 12, wherein said adapted distal end comprises a roller rotatably attached to said support platform.

14. The tilting platform according to claim 13, further comprising a load cell adapted to measure the weight of a tire disposed on said top support pad.

15. The tilting platform according to claim 14, further comprising a tire pad disposed on said load cell and attached to said top support pad thereby preventing said tire pad from sliding relative to said support platform.

16. The tilting platform according to claim 15, wherein said distal end is about 1.5 times farther from said pivotal attachment than said proximal end.

17. The tilting platform according to claim 1, wherein said adapted distal end comprises a roller rotatably attached to said support platform, and said tilting platform further comprising a load cell adapted to measure the weight of a tire disposed on said support platform.

18. The tilting platform according to claim 17, wherein said pivotal attachment comprises a pivot pin extending through a hole in said support platform.

19. The tilting platform according to claim 18, wherein said support platform comprises at least two side beams extending the length of said support platform, a top support pad attached to said side beams, and a side support pad adapted to prevent a tire, from sliding relative to said support platform.

* * * * *